United States Patent [19]
Isaacson, Jr. et al.

[11] Patent Number: 5,782,263
[45] Date of Patent: Jul. 21, 1998

[54] FLOOD CONTROL DEVICE

[75] Inventors: Gary A. Isaacson, Jr., 6610 Crawford St., San Diego, Calif. 92120; Eric Nyenhuis; James Nyenhuis, both of La Mesa, Calif.; Terry Simpkins, Sr.; Terry J. Simpkins, Jr., both of Carlsbad, Calif.

[73] Assignee: Gary A. Isaacson, Jr., San Diego, Calif.

[21] Appl. No.: 691,569

[22] Filed: Aug. 2, 1996

Related U.S. Application Data

[60] Provisional application No. 60/001,918 Aug. 4, 1995.
[51] Int. Cl.⁶ ............................................ F16K 31/12
[52] U.S. Cl. .............. 137/487.5; 137/901; 137/459; 137/624.22; 251/68; 73/861.78
[58] Field of Search .................. 137/460, 487.5, 137/456, 463, 624.13, 624.11, 624.12, 624.22, 901, 459; 251/68, 74, 263, 129.04; 73/861.77, 861.78, 861.79

[56] References Cited

U.S. PATENT DOCUMENTS

| | | | |
|---|---|---|---|
| 1,056,009 | 3/1913 | Crouch | 251/68 |
| 1,374,308 | 4/1921 | MacIsaac | 137/901 |
| 1,402,771 | 1/1922 | Johns | |
| 2,333,261 | 11/1943 | Mantz | 251/68 |
| 2,333,370 | 11/1943 | Graham | 251/68 |
| 2,659,383 | 11/1953 | Frager | |
| 2,926,690 | 3/1960 | Martin | |
| 3,106,937 | 10/1963 | Sands | |
| 3,183,928 | 5/1965 | Rosenberg | |
| 3,815,415 | 6/1974 | Wemyss | |
| 4,049,016 | 9/1977 | Henry | |
| 4,173,144 | 11/1979 | Pounder | |
| 4,404,861 | 9/1983 | Wass | 73/861.79 |
| 4,522,229 | 6/1985 | Van de Moortele | |
| 4,705,060 | 11/1987 | Goulbourne | |
| 4,880,030 | 11/1989 | Terry | |
| 4,881,948 | 11/1989 | Nakane et al. | |
| 4,903,731 | 2/1990 | Pappy | 137/624.11 |
| 5,007,453 | 4/1991 | Berkowitz et al. | |
| 5,038,820 | 8/1991 | Ames | 137/487.5 |
| 5,056,554 | 10/1991 | White | 137/624.11 |
| 5,076,321 | 12/1991 | Terry | |
| 5,265,641 | 11/1993 | Anderson et al. | |
| 5,287,884 | 2/1994 | Cohen | 137/487.5 |
| 5,409,037 | 4/1995 | Wheeler | 137/487.5 |
| 5,427,350 | 6/1995 | Rinkewich | 251/129.04 |
| 5,447,062 | 9/1995 | Kopl | 73/861.78 |

FOREIGN PATENT DOCUMENTS

| | | |
|---|---|---|
| 2292810 | 11/1974 | France |
| 2351335 | 5/1976 | France |
| 1038163 | 8/1966 | United Kingdom |

*Primary Examiner*—Denise L. Ferensic
*Assistant Examiner*—Ramyar Farid
*Attorney, Agent, or Firm*—Knobbe, Martens, Olson & Bear, LLP

[57] ABSTRACT

A flood control device 200 which measures the volume of fluid delivered in a continuous steady flow to a house or building and which shuts off the fluid flow if a preset maximum limit is reached, indicating overly high consumption due to a leak, break or open faucet in the plumbing of the house or building.

6 Claims, 9 Drawing Sheets

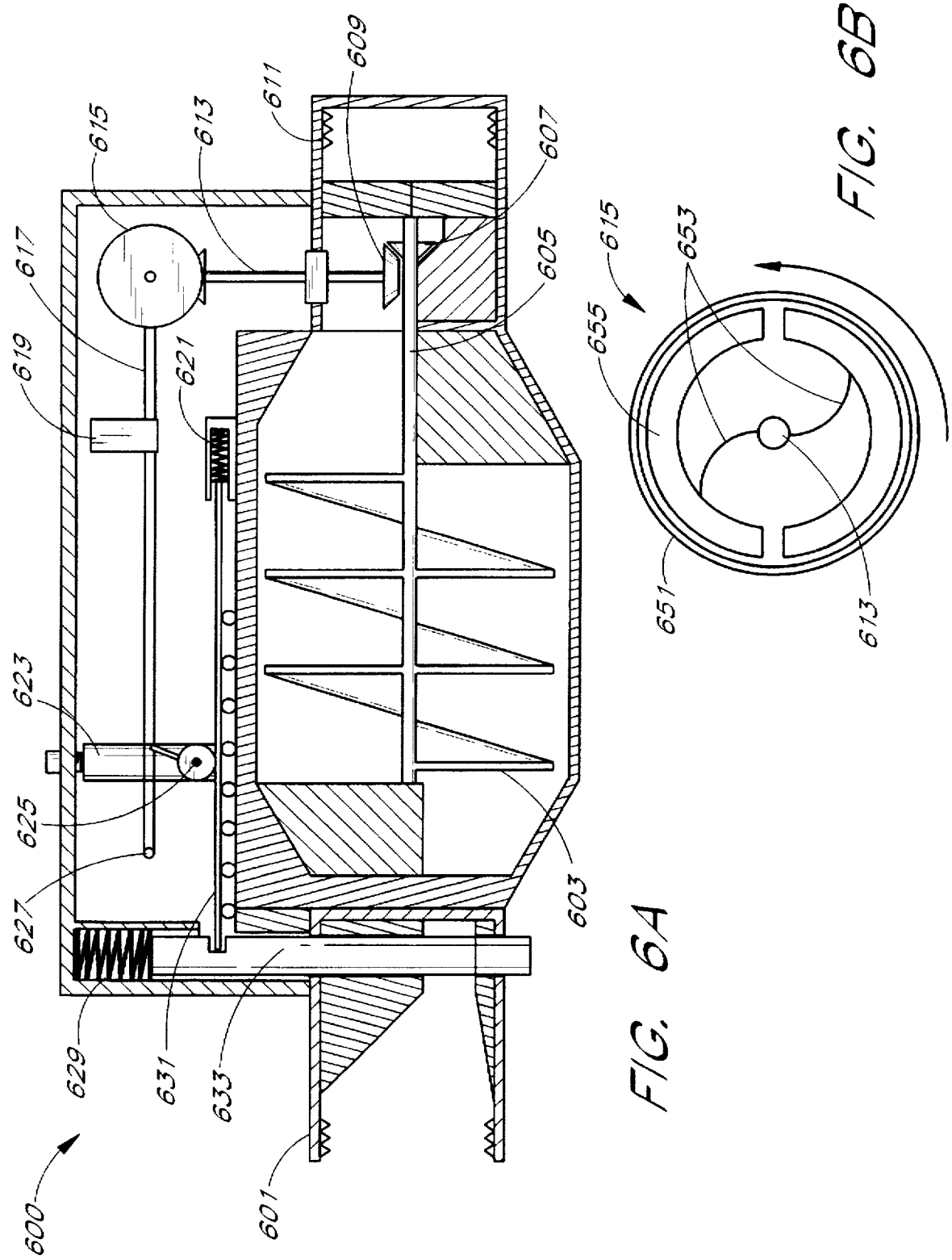

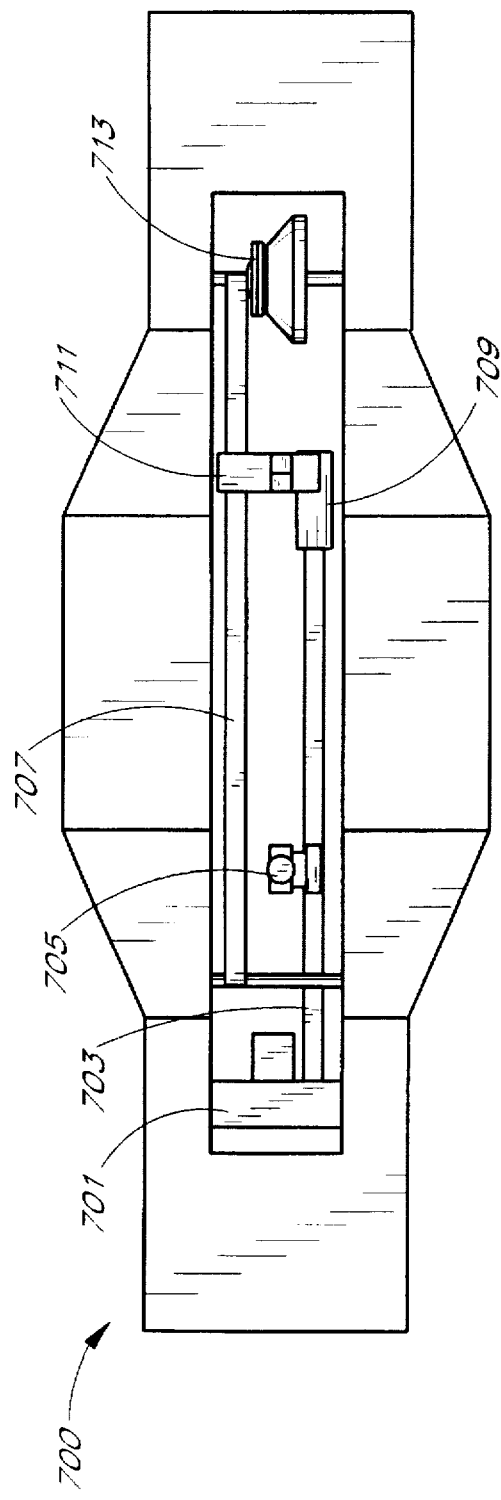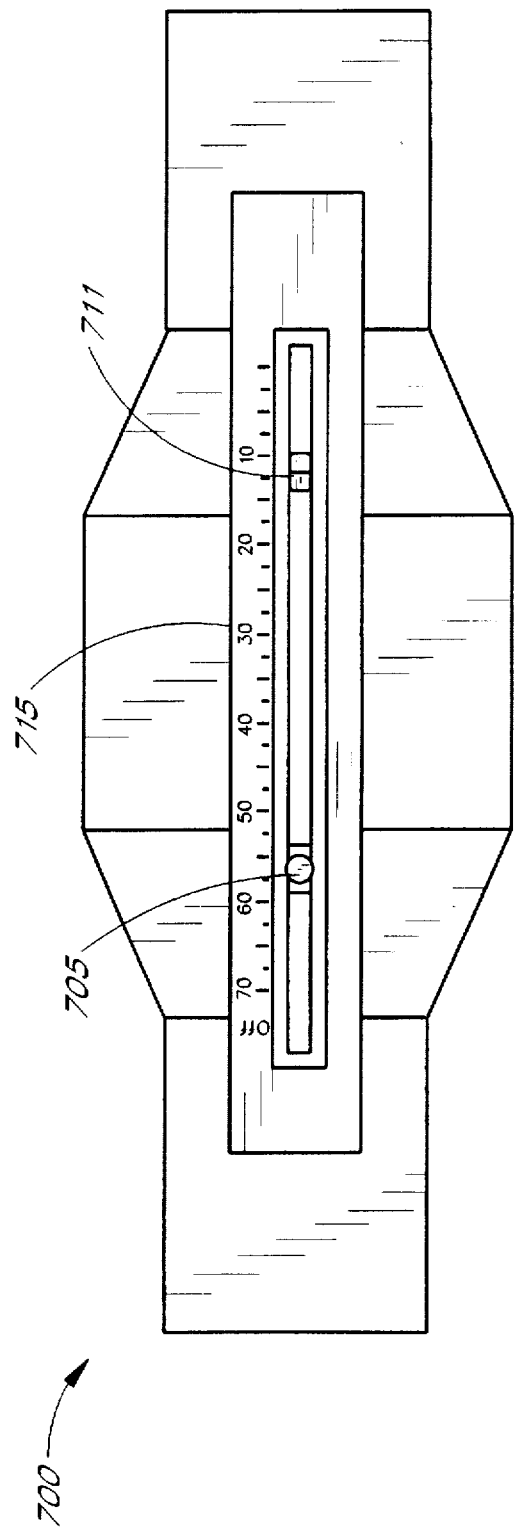

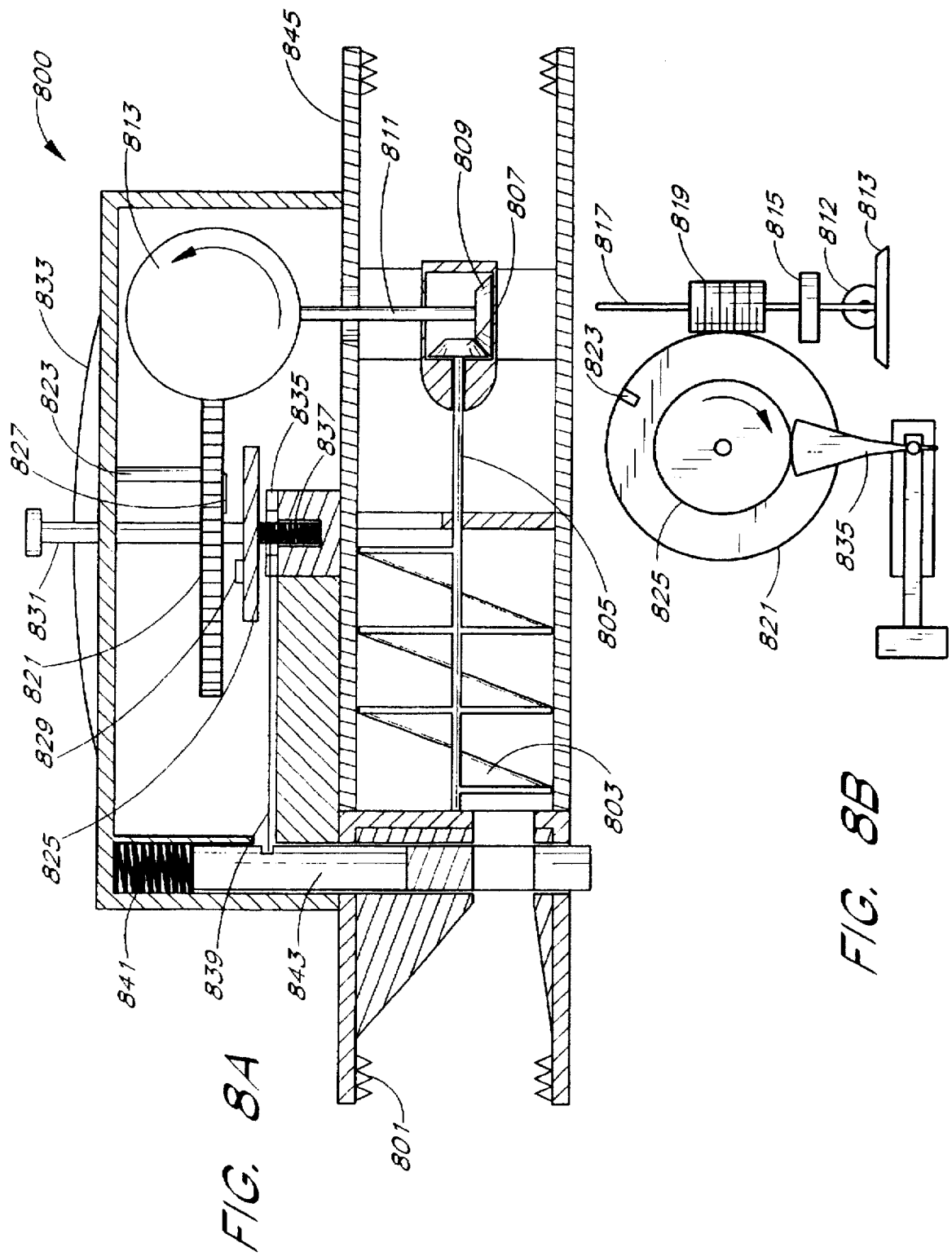

FLOOD CONTROL DEVICE

BACKGROUND OF THE INVENTION

1. Field of the Invention

This application is based on provisional application No. 60/001,918, filed on Aug. 4, 1995.

The present invention relates generally to a safety device which cuts off the water supply to a house or building in the event of overly high water consumption due to a leak, break or open faucet in the plumbing of a house or building. More particularly, the present invention relates to a flood control device which measures the volume of fluid delivered in a continuous steady flow and which shuts off the fluid flow when a preset maximum limit has been exceeded.

2. Description of the Related Art

Other than a fire, perhaps the most catastrophic type of damage which can occur to a home or other building is damage due to water leakage from a broken or badly leaking water line. Since water supply lines may run throughout a house or other building, a leak may occur in the heart of the house or other building, and may result in extensive damage both to the structure and to the contents prior to the water supply being manually shut off.

The main causes of runaway water leakage are ruptured pipes, tubes or fittings; faulty washing machine hoses, water heaters, supply lines and other plumbing equipment; rusty or aging components, electrolysis, poor installation practices, poor quality materials, frozen pipes, tubes or hoses, earthquake activity and pressure surges. With so many different factors that can create plumbing failures and runaway water leaks, one can readily realize the need for a fluid shutoff safety device. Flooding in a home or other building brings water damage resulting in extensive destruction and expense. Massive difficulties ensue in the wake of interior structural flooding as families and businesses must contend with problems including substantial loss of time, money and the home, office or other building involved.

In the prior art, there exists a number of devices which are designed to control flow and to act as a shutoff in the event of a leak. These devices generally fall into two major categories, namely the shock operated type and the flow or pressure operated type. The shock operated device is designed to shut off flow in the event of a major shock such as that of an earthquake or the like. Examples of such devices are found in Lloyd, U.S. Pat. No. 3,747,616, and Mueller, U.S. Pat. No. 3,768,497 and Pasmany, U.S. Pat. No. 4,091,831. These devices are all designed for use with gas lines and do not address the problem of breaks or leaks in the line downstream of the devices. In addition, the shock operated type of control valves do not address the problem of broken or leaking water or gas lines due to normal erosion or the possibility that someone has simply opened a faucet or line and has forgotten to close it.

The second approach, which causes a shutoff of flow in the event of an overly large flow rate or an excess pressure change across the device, is illustrated, for example, by Frager, U.S. Pat. No. 2,659,383, Bandemortelli, U.S. Pat. No. 4,522,229, and Quenin, U.S. Pat. No. 4,665,932. All three of these devices are designed primarily for industrial applications and are large, complex and expensive and therefore, inappropriate for use in a home or other relatively small building. A simpler valve control device designed to cut off the water supply to a house or building is described in U.S. Pat. No. 4,880,030 entitled "Safety Flow Control Fluid Shutoff Device." This device detects a downstream plumbing break or leak by sensing a water pressure increase within the valve. This increase in water pressure forces a piston to block the outlet of the device, thereby stopping flow through the device. It should be understood that the terms, "valve control device," "control valves" and "flood control devices or valves" as used herein, are synonymous and interchangeable.

Control valves which detect a high rate of flow have many drawbacks. With these types of control valves, undesired shut-offs may occur because of a high rate of flow under normal service conditions due to increases of water or gas consumption during a given period or increases in population in a water main's area, for example. Furthermore, if a break occurs, a great amount of water might run away before the predetermined value of rate of flow has been reached to effectuate a valve shut-off.

Control valves which are pressure sensitive are also not reliable because there are many factors that can cause a change in water pressure, which does not necessarily mean that there is an overflow of fluid. For example, in a system where water mains are connected together in any number and one of these mains breaks, the pressure head decreases swiftly not only on the broken main but also on all the other mains and the respective control valves which are connected to these mains may unnecessarily close at the same time. Also, if a pressure sensitive control valve is located in a high place and the upstream length of the main is great, the pressure differences due to gravitational forces can cause variations in the shut-off parameters, leading to possible shut-offs which are unnecessary and inconvenient to customers as well as to water supply companies.

The prior art valve control devices described above do not address the problem of a faucet which has inadvertently been left open. There is no way for these devices to distinguish this situation from everyday normal water use. Furthermore, these prior art valve control devices are unreliable in detecting gradual leaks that create gradual changes in pressure which may be undetectable by the device.

Thus, there clearly exists a need for an improved valve control device that overcomes the deficiencies of the prior art devices and reliably eliminates the potential hazard of flooding. Moreover, such a device is needed which has the capability to measure the volume of a continuous flow of fluid and shut the fluid flow off when a preset maximum volume limit has been reached. Further, an improved flood control valve is needed that can be set for different fluid volumes depending on the size of the building or home or water usage in a particular operation. This would allow a user to advantageously change the volume of fluid which is used during one session to meet the fluid consumption demands of his or her particular home or building.

SUMMARY OF THE INVENTION

The flood control valve of the present invention overcomes the deficiencies of prior art control valves by measuring the volume of fluid which has continuously flowed through the valve. This measurement is reliable because it is not effected by external forces as in the case of measuring a flow rate, or a change in pressure, or detecting a shock due to an earthquake. Additionally, the predetermined volume of fluid to effectuate valve shut-off may easily be adjusted to meet the changing demands of fluid consumption due to seasonal changes, population changes, etc., or the flood control device may be bypassed altogether when it is desired or necessary to continuously consume large volumes of water, e.g., filling a swimming pool.

In one embodiment, the flood control device in accordance with the present invention includes: a housing having an inlet and an outlet; a flow detector for detecting a volume of fluid flowing into the inlet; a controller, coupled to the flow detector, for monitoring the volume of fluid detected by the flow detector; and a shut-off mechanism, coupled to the controller, for shutting off the flow of fluid when the volume being monitored by the controller has reached a preset limit.

In another embodiment, the flood control device of the present invention includes: a housing having an inlet and an outlet; an axially oriented impeller which rotates a specified number of times for a given volume of fluid flowing into the inlet; at least one indicator mass on at least one vane of the axial impeller; a proximity detector for sensing when said at least one indicator mass passes by the proximity detector, thereby indicating a rotation of said axial impeller; an electronic circuit, coupled to the proximity detector, for counting the number of rotations of the axial impeller; a solenoid, coupled to the electronic circuit, for activating a trigger when the electronic circuit has counted a preset number of rotations of the axial impeller; a cocking lever, releasably coupled to the trigger; a cam shaft, attached to the cocking lever; a cam, attached to the cam shaft; and a ball engaging the cam such that when the trigger is activated by the solenoid, the cocking lever releases from a cocked position, rotating the cam shaft and cam and allowing the ball to be seated in a seat of said outlet, thereby closing the outlet and stopping fluid flow through the flood control device.

In a further embodiment, the flood control device of the present invention includes: a housing having an inlet and an outlet; a wheel which rotates a specified number of times for a given volume of fluid flowing into the inlet; a counter, coupled to the wheel, for counting the number of continuous rotations of the wheel; a controller, coupled to the counter, for monitoring the number of rotations counted, thereby monitoring the volume of fluid flow into the inlet, wherein the controller also stores a preset volume limit; a gate driver, coupled to the controller, for activating a shut-off gate, when the volume of fluid flow being monitored by the controller has reached the preset volume; and a shut-off gate for closing the flood control device when activated by the gate driver.

In a further embodiment, a flood control device in accordance with the present invention includes: a housing having an inlet and an outlet; measuring means for measuring a volume of fluid flowing into the inlet; and a trigger, coupled to the measuring means, for activating a shut-off means when the measured volume of fluid reaches a preset maximum limit, wherein the shut-off means, when activated, stops the flow of fluid through the flood control device.

In another embodiment, a flood control device of the present invention includes: a housing having an inlet and an outlet; a helical screw, located within the housing, which rotates a specified number of times for a given volume of fluid flowing into the inlet, the helical screw having a shaft; means for converting the rotation of the screw into linear motion of a trigger; a release mechanism, which is activated by the trigger when a preset volume of fluid has flowed into the inlet; and a shut-off gate which closes the flood control device when the release mechanism is activated.

In a further embodiment, the present invention may be characterized as a method of shutting off the flow of fluid to the plumbing system of a house or building upon detection of a break or leak in the plumbing, or an overflow of water, the method including the steps of: (a) measuring a volume of fluid which continuously flows into a control valve; (b) determining if the volume of fluid has reached a preset limit; and (c) closing the control valve such that no fluid may flow through if it is determined that the volume of fluid has reached the preset limit.

In another embodiment, the present invention may be characterized as a method of shutting off the flow of fluid to the plumbing system of a house or building upon detection of a break or leak in the plumbing, or an overflow of water, the method including the steps of: (a) receiving an inflow of fluid into a control valve, whereby the inflow of fluid rotates a helical axial impeller or wheel a specified number of times for a given volume of fluid entering the control valve; (b) counting the number of rotations of the axial impeller or wheel; (c) determining if the number of rotations has reached a preset limit; and (d) closing the control valve so that no fluid may flow through if the number of rotations reaches the preset limit.

In a further embodiment, the present invention may be characterized as a method of shutting off the flow of gas to the gas lines of a house or building upon detection of a break or leak in a gas line, or an overflow of gas, the method including the steps of: (a) measuring a volume of gas which continuously flows into a control valve; (b) determining when the volume of gas has reached a preset limit; and (c) closing the control valve such that no gas may flow through it when the volume of gas has reached the preset limit.

In a still further embodiment, the present invention may be characterized as a method of shutting off the flow of current to the electrical system of a house or building in the event that an overflow of current is detected, the method including the steps of: (a) measuring the amount of current which continuously flows into a control device; (b) determining when the amount of current has reached a preset limit; and (c) shutting off the control device such that no current may flow through it when the amount of current has reached the preset limit.

The present invention achieves an excellent resolution of the problem of plumbing breaks and leaks in a house or building. In fact, the flood control device of the present invention ensures reliable shutoff in the event of an overflow of fluid. The device may also include means for bypassing the safety flow operation, if desired, by providing a bypass switch or an off position setting in which the flood control device is not monitoring the volume of fluid flow through the device. Further, the present invention is of simple construction and installation, thereby enabling it to be easily and quickly installed in the plumbing system of any house or building.

Although the following embodiments will be described in the context of fluid shut-off in the event of the overflow of fluid, one of ordinary skill in the art can easily implement the principles of operation of the present invention to address the problems of an overflow of gas or electrical current to a house or building.

BRIEF DESCRIPTION OF THE DRAWINGS

The above and other aspects, features and advantages of the present inventions will be more apparent when presented in conjunction with the following drawings wherein:

FIG. 6A is a elevational, cross-sectional, side view of another embodiment of the flood control device of the present invention.

FIG. 6B is an elevational view of one embodiment of the coupling device which may be used in the flood control device of FIG. 6A.

FIG. 7A is a cross-sectional top view of the flood control device of FIG. 6A.

FIG. 7B is a top view of the flood control device of FIG. 6A.

FIG. 8A is an elevational, cross-sectional, side view of another embodiment of the flood control device of the present invention.

FIG. 8B is a top view of the coupling and triggering mechanism which may be utilized in the flood control device of FIG. 8A.

DETAILED DESCRIPTION OF THE PREFERRED EMBODIMENT

Figure 1:
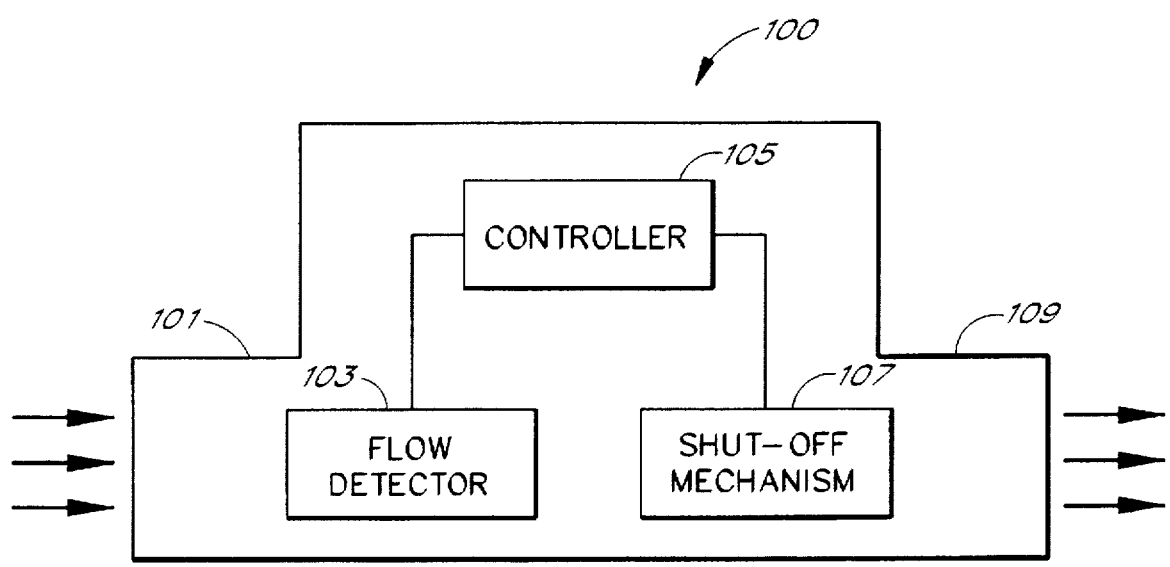
FIG. 1 is a block diagram of one embodiment of the flood control device of the present invention.

The following description of the present invention is not to be taken in a limiting sense, but is made merely for the purpose of describing the general principles of the invention. The scope of the invention should be determined with reference to the claims.

It should be understood at the outset that although the flood control valve of the present invention will be described in the context of water flow in the water lines and plumbing of houses and buildings, the flood control device of the present invention may also be utilized to provide control valves in other areas such as gas lines or systems in which the flow of gas must be regulated. The principles of operation of the flood control valve of the present invention not only provide a means for preventing water damage due to broken, leaking or open water lines, but can also prevent, or at least lessen, the dangerous conditions which result from broken, leaking or open gas lines.

It is a primary function of a flood control valve to prevent water damage to a house or building in which a plumbing line, faucet, or other water source is broken, leaking or inadvertently left open. To this end, the flood control valve of the present invention operates on the principle of metering and measuring the volume of fluid delivered in a continuous steady flow. Such a flood control valve is extremely reliable because the measurement of the volume of a continuous flow is relatively easy and accurate when compared to measuring flow rate changes and pressure changes as in the prior art devices. It is easy to envision the utility that such a reliable flood control valve can provide, for example, in an earthquake situation when there may be many broken lines. By selectively shutting off certain water mains and/or lines, the flood control device of the present invention can close those mains and lines which are wasting water and causing flooding, while keeping open operational water mains and/or lines for use by firefighters or other emergency personnel. By closing off the broken mains and lines, the flood control valve of the present invention ensures that there will be adequate water pressure in the interconnected mains and lines for use by firefighters and other emergency personnel. Historically, inadequate water pressure resulting from broken water mains and lines has posed significant problems for firefighters in their battle against fires which typically arise in the aftermath of a serious earthquake. It should also be noted that the flood control valve of the present invention may be strategically located in the plumbing system of a house or building to shut-off only certain, specified lines. For example, by placing the flood control device downstream of a fire-sprinkler system, the flood control device will not be affected by the consumption of water by the sprinkler system in the event of a fire.

In addition to its primary function of preventing flooding in a house or building, the flood control valve of the present invention may also be used as a water conservation device. By shutting off the flow of fluid after a predetermined volume of fluid has been measured flowing through the device, the flood control device can effectively curtail the waste of water by broken or leaking pipes or by users who unnecessarily use excess amounts of water. It is readily apparent that such a flood control device would be of tremendous value in states such as California or Arizona, for example, where fresh water is scarce and its conservation is a major concern to their respective populations.

FIG. 1 shows a schematic diagram of a flood control valve 100 which includes an inlet 101 that may be connected to any incoming water source, such as a water main. The inlet 101 is typically of cylindrical design and of standard shape to mate with standard water lines for home or business use. Additionally, the inlet 100 may be either internally or externally threaded in order to meet the particular requirements of a given application. It is to be understood, however, that the shape, size and mating characteristics of the inlet 101 may be varied in order to achieve connectivity with any type of water supply line. Flood control device 100 further includes an outlet 109 which is connected to the plumbing system of a house or building. Similar to the inlet 101, the outlet 109 may have any shape, size and mating characteristics in order to achieve connectivity with any type of plumbing line, pipe or faucet of a house or building.

Between inlet 101 and outlet 109, and within a housing 111, the flood control valve 100 further includes a flow detector 103, a controller 105 and a shut-off mechanism 107. The flow detector 103 serves the function of measuring the volume, or quantity, of fluid which has continuously passed through the flood control valve 100. When a preset volume of fluid has been detected by flow detector 103, the controller 105 will activate the shut-off mechanism 107 which then shuts off either the inlet 101 or the outlet 109, thereby stopping any further flow of fluid through flood control valve 100.

Figure 2:
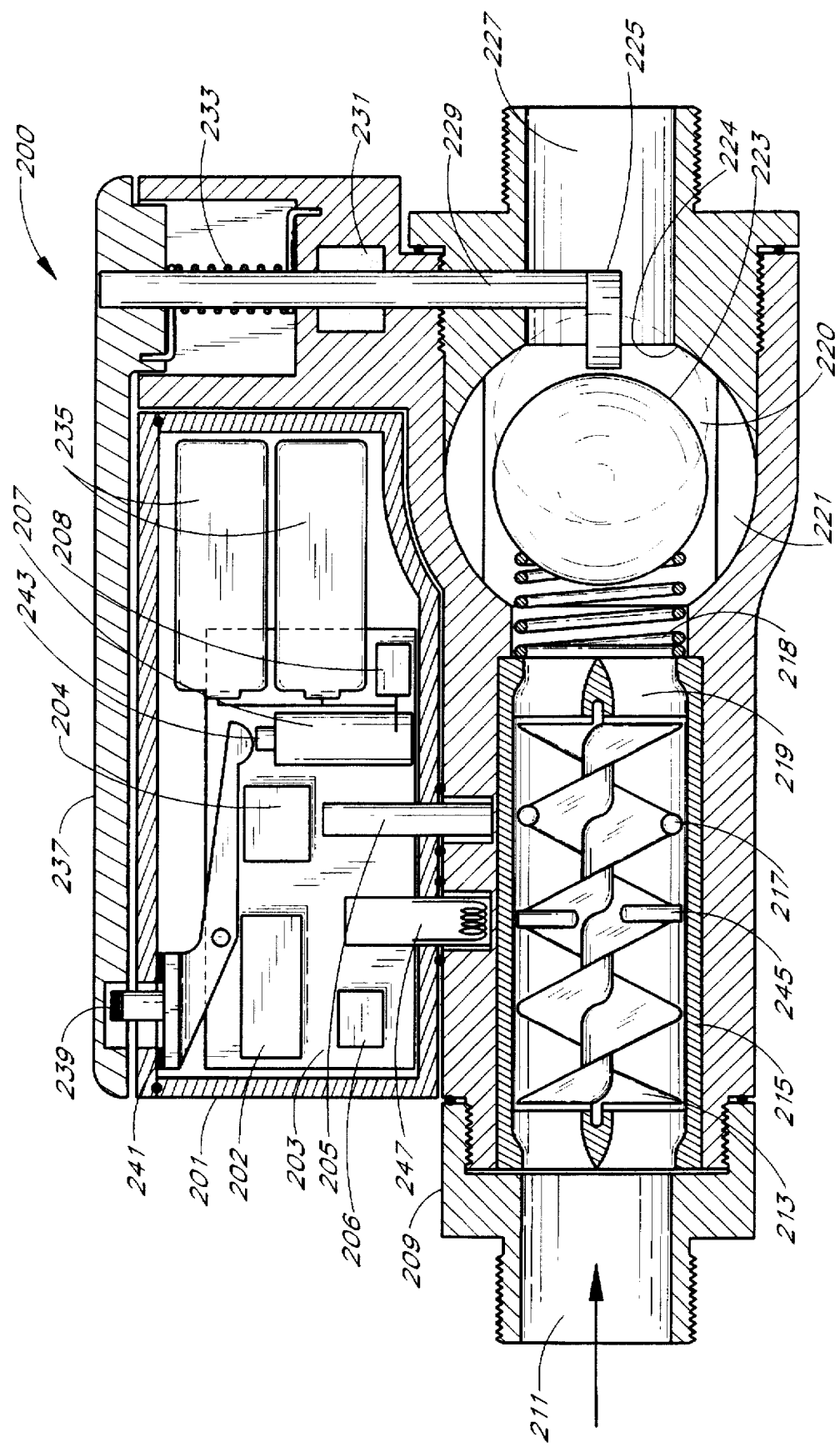
FIG. 2 is an elevational, cross-sectional, side view of an embodiment of the flood control device of the present invention.

Referring to FIG. 2, a flood control device 200 which operates in accordance with the present invention is shown. As fluid flows into inlet 211, the volume of fluid is measured by an electronic circuit 203 that counts revolutions of an axial or centrifugal impeller 213. In the preferred embodiment, an axial impeller 213 is used and a predetermined number of revolutions of the axial impeller 213 represents a gallon of fluid. The continuous flow of fluid counts up on an electronic counter 202 of electronic circuit 203, toward a preset (selected) volume of flow, which may be stored in electronic circuit 203.

When the counter 202 or electronic circuit 203 indicates that the flow has reached the preset number of gallons (revolutions) the electronic circuit 203 activates a solenoid 207 which in turn activates a trigger 239. The activation of trigger 239 closes outlet 227 to stop all flow of the fluid through the flood control device 200 as will be explained in more detail below. The flood control device 200 remains closed until it is manually re-opened by re-cocking a cocking lever 237, which functions as a release mechanism. The functioning of the cocking lever 237 will be described in further detail below. If at any time the flow of fluid is stopped before reaching the preset volume limit, the electronic counting mechanism 202 of electronic circuit 203 resets itself to zero. The electronic circuit 203 is of relatively simple design and includes a counter 202, a memory 204 for storing the values of the preset maximum volume at which the flood control device 200 will shut off fluid flow, a logic circuit 206 for determining when the preset maximum volume limit has been reached and a switch 208 which transfers power form a power source, e.g., a battery pack, to a trigger mechanism such as solenoid 207 which will be described in further detail below. The memory 204 and logic circuit 206 also keep track of whether there is a continuous flow of water. If there is a break or lapse in the flow of water, memory 204 and logic circuit 206 will detect this and reset electronic counter 202 to zero. This function will be described in greater detail below.

A constant flow of fluid through the flood control valve 200 causes the helical axial impeller 213 to turn, even at very low flow rates. The impeller is of very low mass and mounted on either end on small, low resistance bearings 219 which are housed in axial impeller cartridge 215. In the preferred embodiment, axial impeller cartridge is removable so that it may be cleaned or replaced as necessary to ensure proper operation of the flood control valve 200. The material used to construct the impeller 213 should displace the same weight as the fluid being transferred. When this is achieved, the friction within the bearings is reduced since the impeller is neither floating nor sinking, either of which would place a radial load on the impeller bearings 219. In the preferred embodiment, helical axial impeller 213 may be made from a suitable plastic or nylon material having a mass which achieves neutral radial loading when immersed in water.

The impeller 213 has, located on one or several of its vanes, one or more indicator masses 217, preferably of a metal or magnetic material, which can be detected as they pass a proximity sensing device 205, as the impeller is turned by the flow of fluid. The proximity sensing device 205 can be a magnetic reed switch, a "hall effect," eddy current, or optical detector, all of which are well-known in the art. Use of this type of proximity device allows the detection of fluid flow without penetrating the pressure vessel of the fluid line with shafts, wires, or other devices that move, require seals, and represent potential leaks. Resistance on the impeller is minimal or nonexistent, allowing detection at very low flow rates.

As fluid flow turns the impeller 213, the proximity sensing device 205 sends a pulsing electronic signal to the electronic circuit 203. Electronic counter 202 includes a clock that measures the duration between successive pulses. Memory 204 records this pulse duration and logic circuit 206 determines a specified time as a function of this pulse duration, e.g., 2 x pulse duration, which, if exceeded, indicates a break in the flow of fluid. The electronic counter 202 of electronic circuit 203 counts only pulses that are no more than the specified length of time apart. As long as the duration of time between pulses is no more than the specified length of time, the counter 202 continues to log pulses. Whenever the specified length of time is exceeded, the counter 202 resets to zero. Thus, only continuous flow through the flood control valve is measured, so that normal operation of faucets, toilets, etc. will not release the valve but an abnormally long continuous flow will.

In a preferred embodiment, when a specific number of pulses (i.e. 200 pulses=5 gal.) as preset by the user is reached, electronic circuit 203 closes switch 208 and activates a solenoid 207 having a plunger 243 within the solenoid 207. When current is applied to solenoid 207, the plunger 243 is forced upward thereby activating a trigger mechanism 239 which holds cocking lever 237 in place. The solenoid 207 and corresponding plunger 243 operate under the well-known principles of electromagnetic induction and such devices are well-known in the art and commercially available. When the trigger 239 releases cocking lever 237, the cocking lever 237 rotates axially about cam shaft 229 which is attached to the cocking lever 237, which in turn rotates a cam 225. The cocking lever 237 is rotated by means of a drive spring 233 which is held in a coiled position when the cocking lever 237 is in the cocked position. Upon release of the cocking lever 237 by the trigger mechanism 239, the drive spring 233 uncoils thereby rotating the cocking lever 237, the cam shaft 229 and the cam 225. At this point, the cam 225 is in the closed position.

The shut off mechanism can be either a gate valve, a rotating ball valve, or a ball check valve. The preferred shut off mechanism is the ball check valve type as shown in FIG. 2. This valve consists of a ball 223 placed in a ball chamber 220 which is in the flowpath of the fluid. The cam 225 controlled by shaft 229 and cocking lever 237 holds the ball 223 out of a seat 224. The seat 224 and cam 225 are downstream from the ball 223. When the cam 225 is rotated to the position which releases the ball 223, the ball 223 moves into the seat 224, shutting off all fluid flow through the flood control valve. A ball spring 218 can be used to ensure seating of the ball 223 at very low flow rates. This allows shutting down of fluid flow even from a pinhole leak.

The outlet 227 remains in the closed position until the cocking lever 237 is manually placed in the cocked position and fluid flow is restored. As the cocking lever 237 is moved to the cocked position, the cam 225 pushes the ball 223 out of its seat 224 to the open position. Longitudinal movement of the ball 223 in and out of the seat 224 is guaranteed by three ball guide ribs 221, equally placed around the ball chamber 220. Spring loading of the cocking lever 237 causes it to move to the closed position when it is released by triggering mechanism 239. Packing seal 231, or otherwise known as stem packing, is preferably used around the cam shaft, since it penetrates the liquid pressure chamber. Packing seal 231 ensures a water-tight seal so that leaks in the flood control valve 200 are prevented.

The electronic circuit 203 which counts the rotations of helical axial impeller 213, is of simple design which may be implemented by one of ordinary skill in the electronic circuitry field. In the preferred embodiment, electronic circuit 203 is an application specific integrated circuit (ASIC) chip which is compact in size and possesses low power requirements. The electronic counter 202, memory 204 and switch 208 of electronic circuit 203 may be standard components which are well-known in the art. Logic circuit 206 of electronic circuit 203 is also of relatively simple design and in one embodiment, may be a comparator which compares pulse signals and makes a determination as a result of the comparison. Such a logic circuit may be implemented by one of ordinary skill in the electronic circuitry art.

The power to drive the electronic circuitry 203 and the solenoid 207 may be provided by solar cell charged batteries; a power supply transformer plugged into a wall outlet in which the power supply drives the circuit board and keeps a backup battery charged; or a long-life battery pack 235, preferably of the lithium type, as shown in FIG. 2, that drives the circuit for three to five years, or more, and if available, with a low battery aural warning. The long life battery pack 235 with a low power drain electronic circuit is the preferred power source.

Optionally, as shown in FIG. 2, the flood control valve 200 may also include one or more permanent magnets 245 attached to axial impeller 213. When the axial impeller 213 begins to rotate, the permanent magnets 245 successively pass a coil generator 247, thereby inducing current to flow in the coil of the coil generator 247. As the axial impeller 213 spins faster, the induced current increases. This current may be used to charge the long-life battery pack 235.

Figure 3:
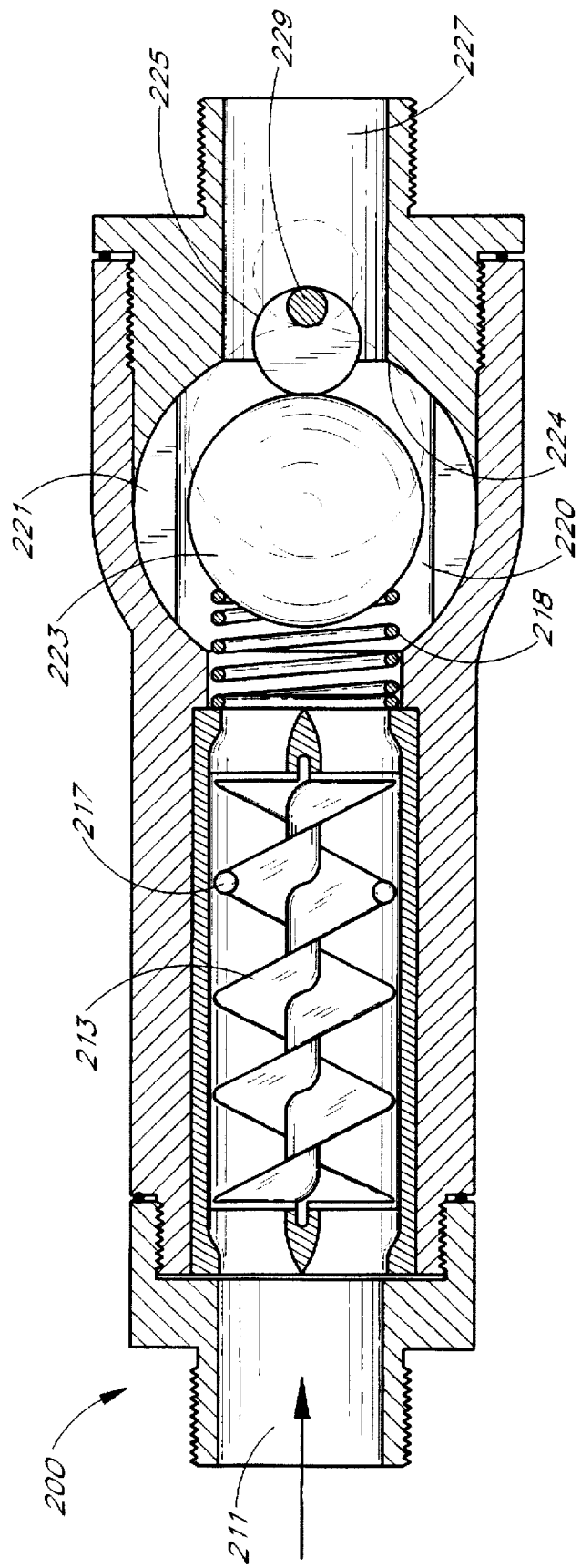
FIG. 3 is a cross-sectional, top view of the flood control device shown in FIG. 2.

A top view of flood control valve 200 is shown in FIG. 3. From FIG. 3 one can see the relative positions of cam 225 and ball 223 in their open and closed positions.

Figure 4:
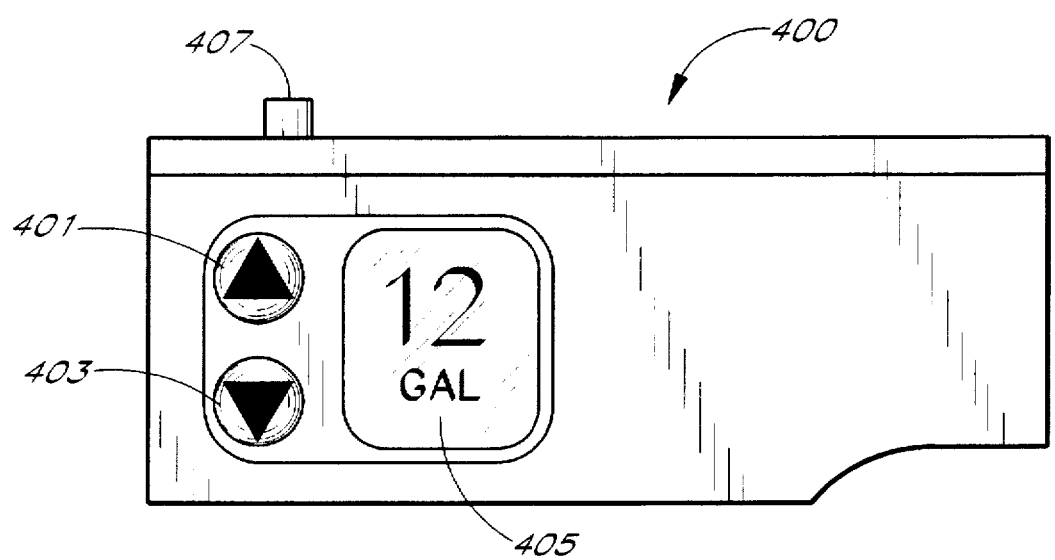
FIG. 4 shows a liquid crystal display (LCD) and corresponding membrane switches used to manually adjust the volume preset at which point the flood control device of the present invention will close.

FIG. 4 shows a LCD display 400 which may be utilized to indicate the maximum volume of continuous fluid flow, e.g., 12 gallons, at which point the flood control device 200 will shut off. Membrane push button switches 401, 403 allow the user to set the desired maximum volume allowed before the valve will shut off flow, by scrolling up or down. In the preferred embodiment, to conserve energy, the display is normally off, and is activated by pushing one of the membrane push buttons 401, 403. After 20 seconds, the display turns off. The LCD display 400 along with corresponding membrane switches 401, 403, may be coupled to electronic circuit 203 (FIG. 2) of flood control device 200, so that a preset volume limit may be adjusted and stored into electronic circuit 203. Additionally, the LCD display 400 may provide a bypass setting in which the flood control device 200 may be bypassed altogether when it is desired or necessary to continuously consume a large volume of water, e.g., filling a swimming pool. In the bypass mode, the flood control device 200 may be bypassed through a bypass pipe (not shown) or simply never trigger the shut-off mechanism to shut-off fluid flow. Such LCD displays are well-known in the art and are commercially available. Similarly, membrane push button switches 401 and 403 are also well-known in the art and are commercially available.

Figure 5:
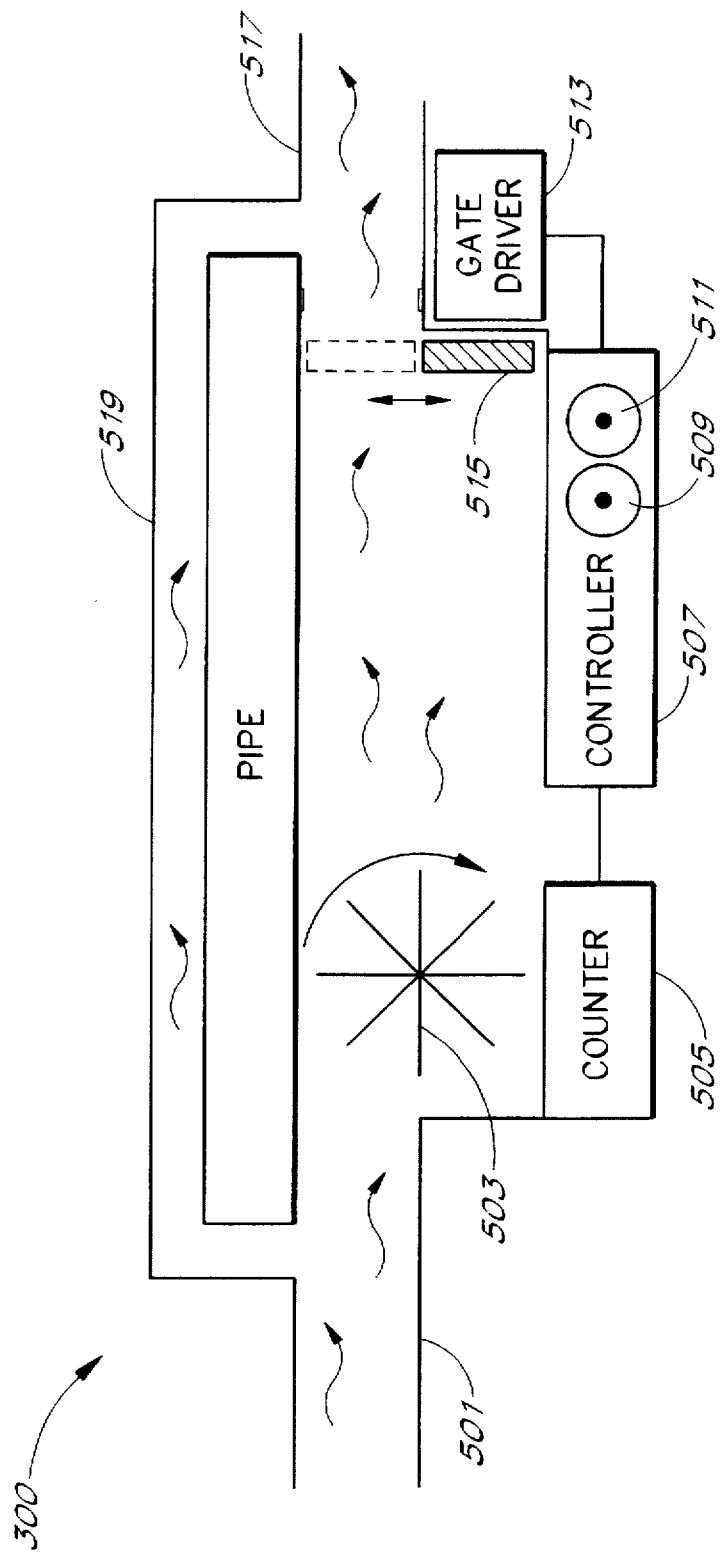
FIG. 5 is a schematic diagram of another embodiment of the flood control device of the present invention.

FIG. 5 shows another schematic diagram of the flood control valve of the present invention. Flood control valve 500 includes an inlet 501 which receives fluid from a water source external to the house or building being protected, e.g., a water main. A counter wheel 503, located within flood control valve 500, rotates a specified number of times for a given volume of fluid flowing into inlet 501. A counter 505, coupled to counter wheel 503, measures the volume of fluid, e.g., gallons, continuously flowing through the valve 500 by counting the number of rotations of counter wheel 503. The counter 505 may be a mechanical or electronic counter either of which are well-known in the art. A controller 507, coupled to the counter 505, monitors the counter 505 and when a preset volume of fluid has been measured, the controller 507 will activate a gate driver 513 to close a gate 515, shutting off the outlet 517. If the fluid flow stops before the preset volume limit is reached, the counter 505 resets to zero. Therefore, only a continuous flow of fluid which reaches the preset volume will be detected as a break, leak, or opening in the pipes or faucet.

The controller 507 may be of mechanical design which advances a mechanical trigger which in turn activates the gate driver 513 when the preset volume of fluid has been reached. Alternatively, the controller 507 may be an electronic circuit which electronically activates the gate driver 513 when the preset volume of fluid has been reached. The gate driver 513 may alternatively be of mechanical design, such as a spring-loaded type which releases shut-off gate 515 when activated by the controller 505. However, it should be understood that the counter wheel 503, counter 505, controller 507, gate driver 513 and gate 515 are not limited to the above descriptions thereof which are merely exemplary. Other embodiments of the components above will be readily apparent to those of ordinary skill in the art and are within the scope of the present invention.

The flood control valve 500 also includes a reset button 511, coupled to controller 507, which will open the gate 515 and reset the counter 505 to a value of zero. The flood control valve 500 also includes a bypass pipe 519 through which fluid flow will be directed upon activation of a bypass switch 509. In the bypass mode, flood control valve 500 simply becomes a connecting valve or pipe through which fluid may flow.

FIG. 6A shows a purely mechanical implementation of a flood control valve 600. In accordance with the present invention, flood control valve 600 also operates on the principle of metering and measuring the volume of fluid in a continuous flow. A steady flow of fluid moves a trigger mechanism 619 toward a release mechanism 623 to release a shut-off gate 633 when a preset maximum volume limit has been reached. If flow stops prior to the limit being reached, the trigger mechanism 619 is reset and made ready for the next flow cycle. The flood control valve 600 is designed to be installed on the main flow line to a residence or other building.

Operation of flood control valve 600 is started when fluid flows into inlet 601 and through a helical screw 603, located at the center of the valve 600, causing the helical screw 603 to rotate. For each rotation of the screw 603, a fixed volume of fluid moves through the valve. A screw shaft 605, driven by the helical screw 603, is connected to a coupling device 615 via a pair of 45° bevel gears 607, 609. As shown in FIG. 6, bevel gear 607 is connected to screw shaft 605 and bevel gear 609 is connected to a drive shaft 613 which drives coupling device 615. The coupling device 615 serves the function of advancing the trigger mechanism 619 during constant flow conditions and allowing it to reset once flow stops.

As shown in FIG. 6b, the coupling device 615 is coupled to drive shaft 613 by means of spring elements 653 which are connected to a pair of semi-circular "pads" 655, or contact pads 655, located within a "drum" formed within the output drive shaft 651. When water is flowing, the driving force imparted by the water turns the input drive shaft 613 and presses the contact pads 655 tightly against the driven drum surface of the output drive shaft 651. In this way, power is transferred across the coupling device 615 to advance the trigger mechanism 619 while compressing or "winding up" a spring element (not shown) attached to the output drive shaft 651 of the coupling device 615.

The trigger mechanism 619 is moved along a rotary belt 617 which moves as the output drive shaft 651 of coupling device 615 rotates. When the flow of water stops, the force pressing the contact pads 655 against the driven drum surface of output drive shaft 651 goes away and the spring (not shown) which is attached to the output drive shaft 651 begins to unwind. In this way, the output drive shaft 651 begins to rotate in the opposite direction and the trigger mechanism 619 returns to its original position. Very little resistance is offered by the contact pads 655 when the drum is rotating in the "unwinding" direction because this motion tends to compress the spring elements 653 on which the contact pads 655 are mounted.

The shut-off gate 633 is located perpendicular to the flow at the entrance, or inlet, to the valve 600. It extends above and below the flow with flow passing through a hole in its center. The gate 633 is spring loaded by means of spring 629 and held in a cocked position by a releasing mechanism. The releasing mechanism consists of a rack 631 and pinion 625 with the rectangular cross section rack 631 spring loaded, by means of spring 621, as the latch in the shut-off gate 633. The pinion 625 has a lever which, when actuated by the linear motion of the trigger 619, will move rack 631, thereby releasing the shut-off gate 633.

As shown in FIGS. 7A and 7B, the pinion 625 is attached to a moveable structure 623 which may be adjusted linearly to change the maximum allowable flow setting. The pinion 625 and its structure 623 may be moved to an off position which raises the pinion above the rack preventing their contact and thus disengaging the triggering mechanism.

When the maximum flow limit has been exceeded, the shut-off gate 633 is released and flow is stopped. In its latched position, a portion of the shut-off gate 633 extends through the flow control valve casing. The downward motion of the shut-off gate 633 exposes a greater amount of the shut-off gate 633, equal to the vertical displacement of the gate 633. Resetting the gate 633 is simply accomplished by pressing up on the shut-off gate 633 and returning it to its latched position.

Referring to FIG. 8A, another embodiment of a flood control valve 800 of the present invention is shown. Similar to the flood control valve 600 of FIG. 6, the flood control valve 800 operates on the principle of metering and measuring the volume of fluid in a continuous flow. Operation of flood control valve 800 is started when fluid flows into inlet 801, through a helical screw 803, located at the center of the valve 800, causing the helical screw 803 to rotate. For each rotation of the screw 803, a fixed volume of fluid moves through the valve. A screw shaft 805, driven by the helical screw 803, is coupled to a rotation gear 813 via a pair of 45 degree bevel gears 807, 809. As shown in FIG. 8A, bevel gear 807 is connected to screw shaft 805 and bevel gear 809 is connected to a drive shaft 811 which drives the rotation gear 813 by means of a second 45 degree bevel gear 812 (FIG. 8B) which is coupled to rotation gear 813.

Referring to FIG. 8B, as fluid flow causes rotation gear 813 to rotate, a coupling device 815 begins rotating as a result of the movement of rotation gear 813. The coupling device 815 is similar to the coupling device 615 of FIG. 6 which is described above and need not be further described here. As coupling device 815 begins rotating, drive shaft 817, coupled to coupling device 815 also begins rotating thereby rotating a worm gear 819 which is coupled to a drive gear 821. As shown in FIG. 8B, as worm gear 819 begins rotating, drive gear 821 is caused to rotate clockwise, thereby moving a usage indicator 823. Below drive gear 821 a triggering gear 825 is located on the same radial axis as drive gear 821.

Figure 8C:
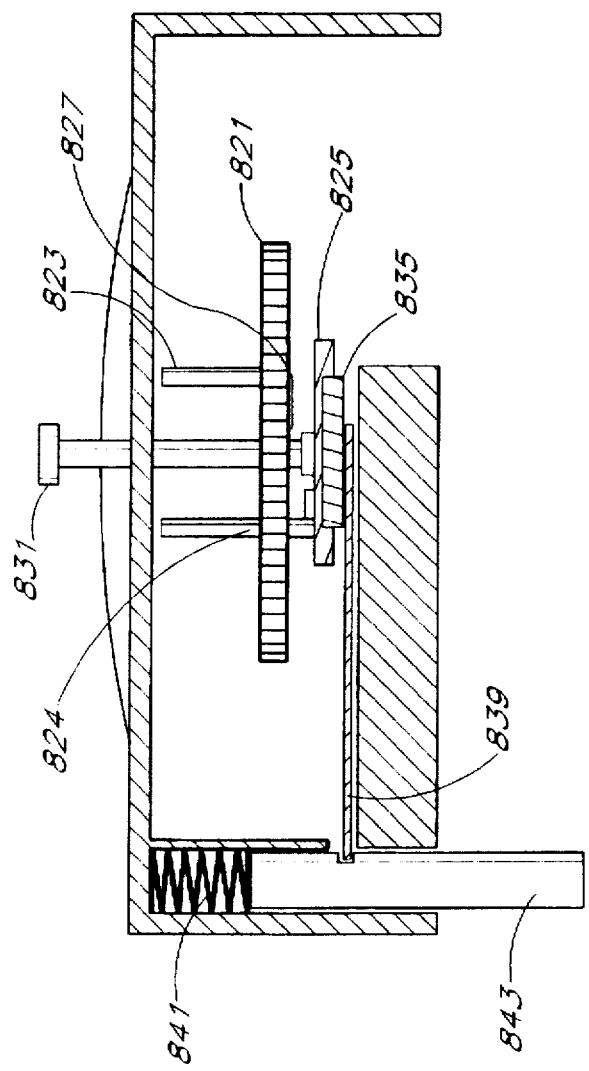
FIG. 8C is a elevational side view of the coupling and triggering mechanism which may be utilized in the flood control device of FIG. 8A.

Referring to FIG. 8C, as drive gear 821 rotates clockwise, a moving latch 827 moves toward a trigger point 824 which is attached to triggering gear 825. When the moving latch 827 contacts the triggering point 824, triggering gear 825 also begins rotating clockwise thereby rotating a spring loaded trigger arm 835 which is mechanically coupled to triggering gear 825 in gear like fashion. When spring loaded trigger arm 835 is moved by triggering gear 825 a gate latch 839 is moved toward the right thereby releasing a gate 843 to close the inlet 801 of the flood control valve 800.

If fluid flow stops before the preset limit has been reached, coupling device 815 will disengage drive shaft 817 and a torsional spring 837 will begin rotating the drive gear 821 counterclockwise thereby resetting the usage indicator 823 to its original position. As explained above coupling device 815 is similar to the coupling device 615 of FIG. 6. Coupling device 815 includes spring elements, contact pads, and an output drive shaft which is similar to those elements as described in relation to coupling device 615 above.

Figure 8D:
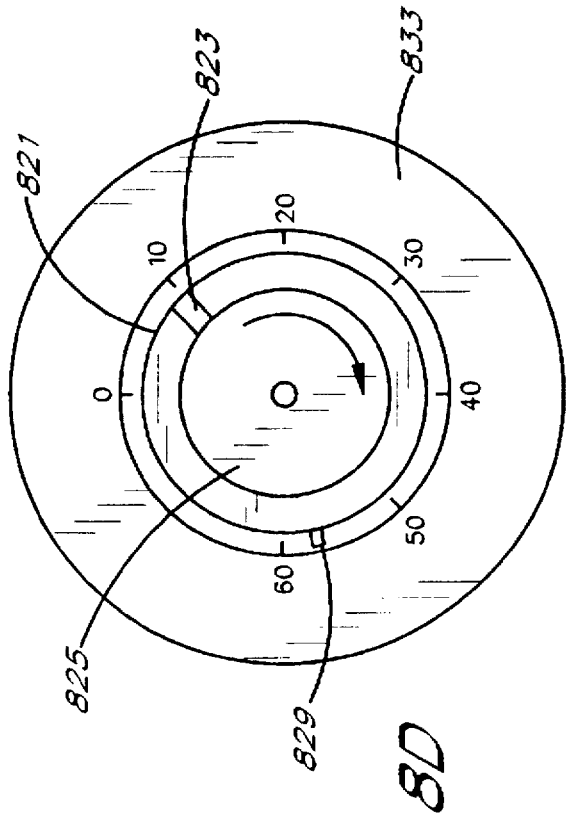
FIG. 8D is a top view of the visual gauge which may be utilized in the flood control device of FIG. 8A.

As shown in FIG. 8A and 8C, the flood control device 800 also includes a setting knob 831 which may be pulled up to set the knob to disengage the flood control valve and thereby operate the valve in a bypass mode. By pressing down on setting knob 831, the setting knob 831 may be turned to set the maximum volume at which the flood control valve will shut off fluid flow. FIG. 8D shows a top view of a gauge design by which a user can set the setting knob 831 to a desired volume setting.

While the invention herein disclosed has been described by means of specific embodiments and applications thereof, numerous modifications and variations could be made thereto by those skilled in the art without departing from the scope of the invention set forth in the claims.

What is claimed is:

1. A flood control device comprising:
    a housing having an inlet and an outlet;
    an impeller which rotates a specified number of times for a given volume of fluid flowing into the inlet;
    at least one indicator mass on at least one vane of the impeller;
    a proximity detector for sensing when said at least one indicator mass passes by the proximity detector, for counting the number of rotations of the impeller;
    an electronic circuit, coupled to the proximity detector, for counting the number of rotations of the impeller;
    a solenoid, coupled to the electronic circuit, for activating a trigger when the electronic circuit has counted a preset number of rotations of the impeller;
    a cocking lever, having first and second ends, wherein the first end is releasably coupled to the trigger;
    a cam shaft having first and second ends and biased with a spring, the first end of the cam shaft being attached to the second end of the cocking lever;
    a cam, attached to the second end of the cam shaft; and
    a ball engaging the cam such that when the trigger is activated by the solenoid, the cocking lever releases from a cocked position, thereby rotating the cam shaft and cam as the first end of said cocking lever swings so as to extend outward from said housing, and thereby allowing the ball to be seated in a seat of said outlet, thereby closing the outlet and stopping fluid flow through the flood control device.

2. The flood control device of claim 1 further comprising means for adjusting said preset number of rotations which will trigger shut-off of the flood control device.

3. The flood control device of claim 1 further comprising at least one battery, coupled to said electronic circuit, for providing power to the electronic circuit.

4. The flood control device of claim 3 further comprising means for electrically charging said at least one battery.

5. The flood control device of claim 4 wherein said charging means comprises at least one permanent magnet connected to said axial impeller; and a coil generator, coupled to said at least one battery, wherein the at least one permanent magnet induces current in the coil generator as the axial impeller spins, causing the at least one permanent magnet to pass near the coil generator, thereby charging the at least one battery with the induced current provided by the coil generator by providing the induced current to the at least on battery.

6. The flood control device of claim 1, wherein said impeller comprises a helical axial impeller.

* * * * *